(12) United States Patent
Zhao et al.

(10) Patent No.: US 6,617,395 B1
(45) Date of Patent: Sep. 9, 2003

(54) LOW VOC LOW TACK GEL COAT RESIN

(75) Inventors: Ming Yang Zhao, Kansas City, MO (US); L. Scott Crump, Gladstone, MO (US); Chih-Pin Hsu, Kansas City, MO (US); Erwoan Pezron, Prairie Village, KS (US)

(73) Assignee: Cook Composites & Polymers Co., North Kansas City, MO (US)

( * ) Notice: Subject to any disclaimer, the term of this patent is extended or adjusted under 35 U.S.C. 154(b) by 0 days.

(21) Appl. No.: 10/118,270

(22) Filed: Apr. 8, 2002

(51) Int. Cl.[7] ............................................. C09D 167/04
(52) U.S. Cl. ............................. 525/48; 525/36; 525/39; 525/40; 525/43; 525/49; 525/445; 528/303; 528/304; 528/306
(58) Field of Search ........................... 525/43, 36, 48, 525/39, 49, 40, 445; 528/303, 304, 306

(56) References Cited

U.S. PATENT DOCUMENTS 3,634,542 A     1/1972   Dowd et al. ............ 260/837 R

FOREIGN PATENT DOCUMENTS

| WO | 00/23495 | 4/2000 | ........... C08C/63/54 |
| WO | 00/23521 | 4/2000 | ........... C08L/67/06 |

*Primary Examiner*—Patricia A. Short
(74) *Attorney, Agent, or Firm*—Whyte Hirschboeck Dudek SC

(57) ABSTRACT

A low tack, low VOC gel coat is disclosed comprising a unsaturated polyester resin derived from maleic anhydride and up to about 30% of an organic solvent. The resin is characterized by: a viscosity of less than or equal to about 1750 cp at 70% NVM in styrene; a glass transition temperature greater than or equal to about 11° C.; and a weight average molecular weight less than or equal to about 6,050. A process for making such a gel coat is also disclosed.

25 Claims, 1 Drawing Sheet

LOW VOC LOW TACK GEL COAT RESIN

FIELD OF THE INVENTION

This invention pertains to polyester resins, more specifically thermoset polyester resins used for gel coats.

BACKGROUND OF THE INVENTION

Gel coats have been known in the field of fiber reinforced polymers. Typically, the gel coat resin is dissolved in a reactive monomer such as styrene or methyl methacrylate (MMA) in order to apply the gel coat as a spray. Depending on the spray conditions, formula, equipment and a number of other factors, roughly a third to more than half of the styrene and MMA in a gel coat formula can be lost to the atmosphere during application. For instance, based on the CFA's Styrene Emissions Determination Models, a single 540 pound drum of a conventional gel coat, when applied by uncontrolled spray techniques, could generate over 100 pounds of emissions known as VOC (volatile organic compounds). A fabricator using two drums of gel coat per day will generate over 25 tons of VOC emissions in one year.

Government regulations, such as the 1990 Clean Air Act (Section 112) regulate the emissions for a number of products and processes including the emissions of hazardous air pollutants (HAP) resulting from the spray application of gel coats during the open molding process. The EPA sets MACT (Maximum Achievable Control Technology) standards that industries must follow. As such, fabricators and resin suppliers are interested in lower VOC emitting gel coats.

Another important aspect of gel coats is the tackiness and cure time of the gel coat. Tackiness affects how soon the fiber-reinforced polymer can be laid up in the mold and, for a large open mold such as boat hulls, how soon the gel coat can be walked on. Many prior art gel coats are still tacky after more than one to two hours of curing.

Therefore, it would be desirable to have a low VOC low tack gel coat that solves the aforementioned problems.

SUMMARY OF THE INVENTION

The present invention provides a low VOC low tack gel coat that overcomes the aforementioned problems.

In one preferred embodiment, the invention is a low VOC, low tack gel coat composition comprising: (A) a unsaturated polyester resin derived from at least two reactants, one reactant of which is maleic anhydride, the resin characterized by: (a) a high shear viscosity (at least 500 s$^{-1}$) in styrene solution, at a concentration of 70% non-volatile matter, less than or equal to about 1750 cps; (b) a glass transition temperature greater than or equal to about 11° C.; and, (c) a weight average molecular weight, $M_w$, less than or equal to about 6,050; and, (B) up to 34% by weight, based on the total weight of the composition, of an organic solvent capable of polymerization with the unsaturated polyester resin.

Another preferred embodiment of the invention is a low VOC, low tack gel coat composition comprising: (A) a unsaturated polyester resin obtained by (1) reacting a first reaction mixture comprising a dicarboxylic acid and at least one polyol to form a first reaction product, and (2) reacting a second reaction mixture comprising the first reaction product and further reactant monomers comprising maleic anhydride and a monocarboxylic acid to form the unsaturated polyester resin; and (B) up to 70% by weight of the total composition of an organic solvent capable of polymerizing with the unsaturated polyester resin, wherein the unsaturated polyester resin is characterized by: (a) a high shear viscosity (at least 500 s$^{-1}$) in styrene solution, at a concentration of 70% non-volatile matter, less than or equal to about 1750 cp; (b) a glass transition temperature greater than or equal to about 11° C.: and, (c) a weight average molecular weight, $M_w$, less than or equal to about 6,050.

In still another preferred embodiment, the invention is a process for preparing a low VOC, low tack gel coat, the process comprising the steps of: (A) forming a first reaction mixture comprising a dicarboxylic acid and at least one polyol; (B) reacting the first reaction mixture to form a first reaction product; (C) forming a second reaction mixture comprising the first reaction product and further reactant monomers comprising maleic anhydride and a monocarboxylic acid; and (D) reacting the second reaction mixture to form a unsaturated polyester resin, wherein the unsaturated polyester resin is characterized by: (a) a high shear viscosity (at least 500 s$^{-1}$) in styrene solution, at a concentration of 70% non-volatile matter, less than or equal to about 1750 cp; (b) a glass transition temperature greater than or equal to about 11° C.; and, (c) a weight average molecular weight, $M_w$, less than or equal to about 6,050.

Various other features, objects and advantages of the present invention will be made apparent from the following detailed description and the drawings.

BRIEF DESCRIPTION OF THE DRAWINGS

Preferred embodiments of the invention are described below with reference to the following accompanying drawings, which are for illustrative purposes only.

DETAILED DESCRIPTION

Figure 1:
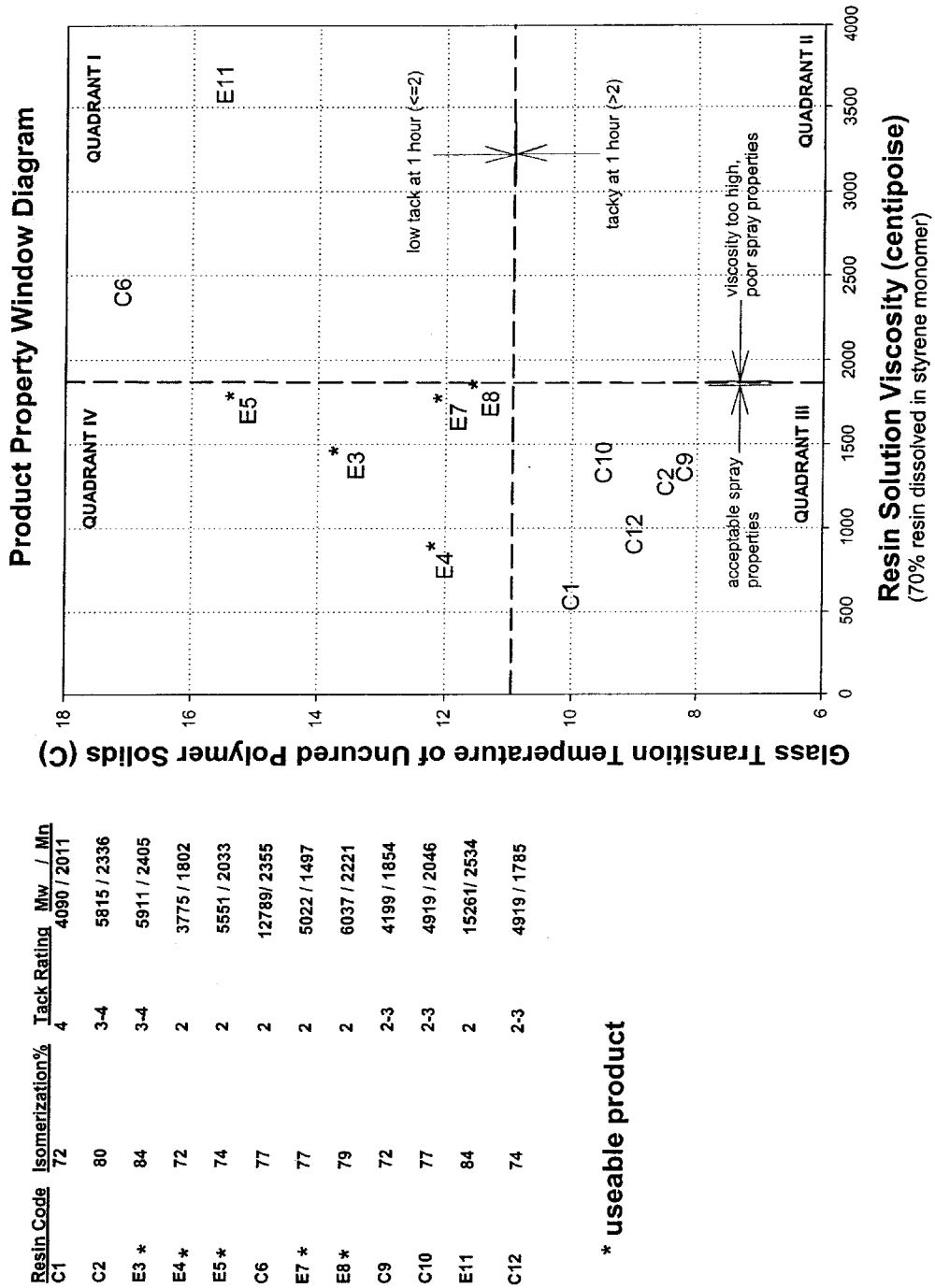
FIG. 1 shows a Cartesian graph wherein the gel coats are plotted with the x-axis being viscosity and the y-axis being glass transition temperature ($T_g$).

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that chemical changes may be made without departing from the spirit and scope of the present invention.

A gel coat is a specially formulated polyester resin primarily used for contact molding (hand or spray lay up). The gel coat provides a molded-in finished surface, and a weather and wear resistant coating over the glass reinforcement. It helps to cover or conceal the glass reinforcement pattern, which may show through from the inherent resin shrinkage around the glass fibers. Typically the gel coat is formulated with thixotropic agents, fillers for flow properties, pigments to yield the desired color and additives with specific quality such as gel time and cure. The gel coat should be resilient, light stable, and pigmented sufficiently for good hiding.

Low VOC gel coats are generally considered to be gel coats dissolved in 35% or less of styrene or other reactive monomer such as MMA. Conventional gel coats are dissolved in 35–50% styrene or other reactive monomer. However, a conventional gel coat may not be made into a low VOC gel coat merely by increasing the concentration of non-volatile matter (NVM) because the increased concentration would unacceptably increase the gel coat viscosity. The gel coat solution is applied by spraying in order to obtain the best results. For practical reasons, the gel coat solution must be no more than about 1750 cp to obtain acceptable spray characteristics with conventional spraying equipment. As such, the backbone of the gel coat must be reformulated by changing polymer, monomer and fillers.

The inventive gel coat comprises an unsaturated polyester resin derived from at least two reactants, one of which is maleic anhydride. The unsaturated polyester resin is characterized by: (a) a high shear viscosity (at least 500 $s^{-1}$) in styrene solution, at a concentration of 70% non-volatile matter, less than or equal to about 1750 cp; (b) a glass transition temperature greater than or equal to about 11° C.; and, (c) a weight average molecular weight, $M_w$, less than or equal to about 6,050.

A suitable resin composition usable in this invention comprises the reaction product of a dicarboxylic acid, at least one polyhydric alcohol, maleic anhydride and a saturated monocarboxylic acid. As a starting material in the present process, the dicarboxylic acid has the general formula $R(COOH)_2$ wherein R is a valency bond, as in oxalic acid, or an organic radical which may consist of: an aliphatic radical (e.g., adipic acid); an ethylenically unsaturated aliphatic radical (e.g., maleic acid); an aryl radical (e.g., phthalic acid); and halogenated aryl radicals (e.g., tetrachlorophthalic acid). Where the dicarboxylic acid of this invention also includes ethylenic unsaturation (e.g., maleic acid, fumaric acid), the resulting polyester will contain additional ethylenically unsaturated sites for subsequent cross-linking and copolymerization.

Suitable acids include phthalic acid, isophthalic acid, terephthalic acid, maleic acid, fumaric acid, succinic acid, adipic acid, and their halogenated derivatives such as tetrachlorophthalic acid and tetrabromophthalic acid, preferably isophthalic acid.

The saturated monocarboxylic acid is typically benzoic acid or p-tert-butyl benzoic acid, preferably benzoic acid. The polyhydric alcohol is typically a dihydric alcohol (also called glycol or diol). Such diols are known in the art and include, inter alia, ethylene glycol, propylene glycol, neopentyl glycol and BEPD (2-butyl-2-ethyl-1, 3 propanediol).

A preferred process for preparing the low VOC, low tack gel coat of this invention comprises the steps of:
(A) forming a first reaction mixture comprising a dicarboxylic acid and at least one polyol;
(B) reacting the first reaction mixture to form a first reaction product;
(C) forming a second reaction mixture comprising the first reaction product and further reactant monomers comprising maleic anhydride and a monocarboxylic acid; and
(D) reacting the second reaction mixture to form a unsaturated polyester resin.

The dicarboxylic acid and polyols are reacted in a first stage reaction at about 200° C. for approximately seven hours. The first stage reaction is stopped at an acid value of less than about 10 mg KOH/g preferably about 8 mg KOH/g. In a second stage reaction maleic anhydride and the saturated monocarboxylic acid are added and the reaction proceeds for about 10 more hours at about 200° C. to an acid value less than about 10 mg KOH/g The resins usable in the current invention are typically low molecular weight resins. Preferably, the resins have a weight average molecular weight $M_w$, of less than 6050 more preferably less than 6000. One skilled in the art will understand that the molecular weight of the resin can be controlled by reaction conditions such as time and temperature and choice and concentration of reactants.

The resin composition of the current invention will have a high degree of maleic anhydride conversion to fumaric acid isomer. Typically, the conversion to fumaric acid is at least 70%, more preferably at least 72% and most preferably, at least 75%. Isomerization may be controlled by reaction temperature and reaction time. The formula of the starting materials and the sequence of addition may also be varied to control the degree of isomerization.

The resin compositions usable in the current low VOC low tack gel coat resin have relatively high glass transition temperatures (Tg). The glass transition temperature is the temperature at which an amorphous material such as a high polymer changes from a brittle vitreous state to a plastic state. The glass transition state may be measured by standard testing such as Differential Scanning Calorimetry (DSC). The following procedure was used to measure the Tg values reported herein.

1. The sample is stripped of all solvents in a vacuum oven.
2. Approximately mg of sample is weighed into an aluminum DSC plan and an aluminum lid is crimped on.
3. The DSC test method is as follows:
   A. Equilibrate the sample at –50° C.
   B. Hold the sample isothermally at –50° C. for 5 minutes
   C. Modulate +/– 0.50° C. every 30 seconds
   D. Ramp the sample 5.00° C./min to 200.00° C.
4. The data analysis is completed by choosing 2 points in the baseline (one on each side of the inflection) in the reversible heat flow curve. The software will then determine the Tg at the inflection point.

Gel coats with glass transition temperatures equal to or greater to about 11° C. have been found to be low tack when measured after one hour at room temperature of about 75° F.

Tack is measured by the following procedure:
1. Catalyze the gel coat with 1.8% DDM-9 (an MEKP catalyst) and stir for one minute. 2. Spray the material onto a 15"×15" glass mold with a pot pressure on the spray gun of 15 psi.
3. Draw the material down at 23 mils for approximately half of the mold and then at 48 mils for the rest of the mold.
4. At one and two hours from catalyzation a light finger pressure is used to touch each thickness and rate the tack using a semi-quantitative scale.
5. A subjective rating scale of 1 through 5 is used to determine the tackiness as shown in Table 1.

TABLE 1

| Tack Rating Scale | | |
| --- | --- | --- |
| Tack Score | Tack Description | Reference Standard |
| #1 | No tack | 944 series available from CCP |
| #2 | Slight tack | |
| #3 | Moderate tack | |
| #4 | Tacky | |
| #5 | Very tacky | 951 series available from CCP |

EXAMPLES

Gel Coat Resin 1

Isophthalic acid, neopentylglycol, 2-butyl-2-ethyl-1, 3-propanediol (BEPD) were charged into a 2 liter flask equipped with an agitator condenser, thermometer and nitrogen spage tube. The mixture was heated to about 200° C., as shown in Table 3A and 3B, in four hours and held to about a 10 mg KOH/g acid number. The mixture was cooled to 140° C. and maleic anhydride and benzoic acid were charged into the flask. The reaction temperature was maintained at 200° C. until an acid number of about 10 mg KOH/g was obtained. The polyester was then cooled and thinned into inhibited styrene. The resin composition and properties are given in Table 2 and Table 3A and 3B.

FIG. 1 shows a Cartesian plot of the resin properties shown in Table 3. Resins usable in the current invention are located in Quadrant IV of FIG. 1. Resins located in Quadrant I are too high in viscosity for spraying and have too high of a molecular weight. Resins located in Quadrant II would have too high of a viscosity for spraying and would be tacky after one hour at room temperature. Resins located in Quadrant III have a viscosity low enough for good spraying characteristics but are tacky after one hour at room temperature.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

TABLE 2

Resin Composition

| Base Resin | A | B | C |
|---|---|---|---|
| Neopentyl glycol (wt %) | 14.1 | 38.9 | 30.0 |
| BEPD (wt %) | 42.1 | 11.8 | 22.7 |
| Isophthalic acid (wt %) | 16.2 | 18.2 | 17.5 |
| Maleic anhydride (wt %) | 25.3 | 28.5 | 27.3 |
| Benzoic acid (wt %) | 2.3 | 2.6 | 2.5 |

TABLE 3A

Resin Properties

| | Example | | | | | |
|---|---|---|---|---|---|---|
| | C1 | C2 | E3 | E4 | E5 | C6 |
| Base Resin | A | A | A | B | B | B |
| Acid Value (mgKOH/g) | | | 6.2 | 10.2 | | |
| Resin Viscosity (cp) at 70% NVM in styrene | 590 | 1275 | 1375 | 775 | 1700 | 2400 |
| Mn | 2011 | 2336 | 2405 | 1802 | 2033 | 2355 |
| Mw | 4090 | 5815 | 5911 | 3775 | 5551 | 12789 |
| Polydispersity | 2.033 | 2.489 | 2.458 | 2.095 | 2.730 | 5.431 |
| Tg-Polymer (° C.) | 10.0 | 8.5 | 13.4 | 12.0 | 15.1 | 17.1 |
| Maleic Anhydride Conversion (%) | 72 | 80 | 84 | 72 | 74 | 77 |
| Gel Coat Ref. | B290-165A | B290-165B | B290-165C | B290-165D | B290-165E | B290-165F |
| Tackiness | 4 | 3–4 | 3–4 | 2 | 2 | 2 |
| Porosity | None | None | None | None | None | None |
| NVM (%) | 67.0 | | | | | |
| Viscosity (cp) | 10,900 | 11,350 | 12,150 | 11,500 | 11,050 | 14,200 |
| T.I. | 5.9 | 5.6 | 5.4 | 5.6 | 5.6 | 5.0 |

TABLE 3B

Resin Properties

| | Base Resin | | | | | |
|---|---|---|---|---|---|---|
| | E7 | E8 | C9 | C10 | E11 | C12 |
| Base Resin | C | C | C | C | C | C |
| Acid Value (mgKOH/g) | 12.2 | 10.9 | 11.7 | 8.76 | 5.68 | 6.2 |
| Resin Viscosity (cp) at 70% | 1660 | 1740 | 1360 | 1392 | 3640 | 960 |
| Mn | 1497 | 2221 | 1854 | 2046 | 2534 | 1785 |
| Mw | 5022 | 6037 | 4199 | 4919 | 15261 | 4919 |
| Polydispersity | 3.35 | 2.72 | 2.27 | 2.40 | 6.023 | 2.76 |
| Tg-Polymer (° C.) | 11.8 | 11.3 | 8.22 | 9.50 | 15.50 | 8.97 |
| Color | <2 | <2 | 2 | 2 | 2 | 1 |
| Maleic Anhydride Conversion (%) | 77 | 79 | 72 | 77 | 84 | 74 |
| Gel Coat Ref. | B290-84 | B290-110 | B290-117A | B290-117B | B290-117C | B290-117D |
| Tackiness | 2 | 2 | 2–3 | 2–3 | 2 | 2–3 |
| Porosity | Slightly 48 mils | none | Slightly 48 mils | Slightly 48 mils | Slightly 48 mils | None |
| NVM (%) | | 65.6 | 68.7 | 67.0 | 67.7 | 66.8 |
| Viscosity (cp) | 11950 | 13650 | 11700 | 10900 | 16600 | 9650 |
| T.I. | 4.5 | 5.0 | 4.7 | 4.9 | 4.4 | 5.0 |

What is claimed is:

1. A low VOC, low tack gel coat composition comprising:
   (A) a unsaturated polyester resin derived from at least two reactants, one reactant of which is maleic anhydride, the resin characterized by: (a) a viscosity at 500 s$^{-1}$ in styrene solution, at a concentration of 70% non-volatile matter, less than or equal to about 1750 cp; (b) a glass transition temperature greater than or equal to about 11° C.; and, (c) a weight average molecular weight, $M_w$, less than or equal to about 6,050; and,
   (B) up to about 34% by weight, based on the total weight of the composition, of an organic solvent capable of polymerization with the unsaturated polyester resin.

2. The composition of claim 1 wherein the reactants further comprise 2-butyl-2-10 ethyl-1, 3-propanediol.

3. The composition of claim 2 wherein the 2-butyl-2-ethyl-1, 3-propanediol comprises at least about 10 mole percent of the total reactants.

4. The composition of claim 1 wherein the maleic anhydride is converted to fumaric acid.

5. The composition of claim 4 wherein at least 70% of the maleic acid is isomerized to fumaric acid.

6. The composition of claim 1 wherein the reactants do not comprise an effective amount of a mono-alcohol.

7. The composition of claim 6 wherein less than 5.0 mole percent, based on the total reactants, of mono-acid is present.

8. The composition of claim 1 wherein the organic solvent is at least one of styrene vinyl toluene, alpha-methyl styrene or methylrnethacrylate.

9. The composition of claim 8 wherein the organic solvent is styrene.

10. A low VOC, low tack gel coat composition comprising:
    (A) a unsaturated polyester resin obtained by (1) reacting a first reaction mixture comprising a dicarboxylic acid, a glycol and a polyol to form a first reaction product, and (2) reacting a second reaction mixture comprising the first reaction product and further reactant monomers comprising maleic anhydride and a monocarboxylic acid to form the unsaturated polyester resin; and
    (B) up to 70% by weight of the total composition of an organic solvent capable of polymerizing with the unsaturated polyester resin,
    wherein the unsaturated polyester resin is characterized by: (a) a viscosity at 500 s$^{-1}$ in styrene solution, at a concentration of 70% non-volatile matter, less than or equal to about 1750 cp; (b) a glass transition temperature greater than or equal to about 11° C.: and, (c) a weight average molecular weight, $M_w$, less than or equal to about 6,050.

11. The composition of claim 10 wherein the polyol comprises 2-butyl-2-ethyl- 1, 3-propanediol.

12. The composition of claim 11 wherein the 2-butyl-2-ethyl- 1, 3-propanediol comprises at least about 10 mole percent of the total of all reactant monomers present in at least one of the first reaction mixture or the second reaction mixture.

13. The composition of claim 10 wherein the dicarboxylic acid is isophthalic acid.

14. The composition of claim 10 wherein the glycol is neopentyl glycol.

15. The composition of claim 10 wherein the monocarboxylic acid is benzoic acid.

16. The composition of claim 10 wherein monocarboxylic acid comprise less than about 5.0 mole percent of the total of all reactant monomers present in at least one of the first reaction mixture or the second reaction mixture.

17. The composition of claim 10 wherein at least 70% by weight of the maleic anhydride is converted to the fumaric acid isomer.

18. A process for preparing a low VOC, low tack gel coat, the process comprising the steps of:
    (A) forming a first reaction mixture comprising reactant monomers comprising a dicarboxylic acid, and at least one polyol;
    (B) reacting the first reaction mixture to form a first reaction product;
    (C) forming a second reaction mixture comprising the first reaction product and further reactant monomers comprising maleic anhydride and a monocarboxylic acid; and
    (D) reacting the second reaction mixture to form a unsaturated polyester resin, wherein the unsaturated polyester resin is characterized by: (a) a viscosity at 500 s$^{-1}$ in styrene solution, at a concentration of 70% non-volatile matter, less than or equal to about 1750 cp; (b) a glass transition temperature greater than or equal to about 11° C.; and, (c) a weight average molecular weight, $M_w$, less than or equal to about 6,050.

19. The process of claim 18 wherein the polyol comprises 2-butyl-2-ethyl-1, 3-propanediol.

20. The process of claim 18 wherein the 2-butyl-2-ethyl-1, 3-propanediol comprises at least about 10 mole percent of the total of all reactant monomers present in at least one of the first reaction mixture or the second reaction mixture.

21. The process of claim 18 wherein the dicarboxylic acid is isophthalic acid.

22. The process of claim 18 wherein the glycol is neopentyl glycol.

23. The process of claim 18 wherein the monocarboxylic acid is benzoic acid.

24. The process of claim 18 wherein mono-carboxylic acid comprise less than about 5.0 mole percent of the total of all reactant monomers present in at least one of the first reaction mixture or the second reaction mixture.

25. The process of claim 18 wherein at least 70% by weight of the maleic anhydride is converted to the fumaric acid isomer.

* * * * *

UNITED STATES PATENT AND TRADEMARK OFFICE
CERTIFICATE OF CORRECTION

PATENT NO.    : 6,617,395 B1
DATED         : September 9, 2003
INVENTOR(S)   : Ming Yang Zhao et al.

It is certified that error appears in the above-identified patent and that said Letters Patent is hereby corrected as shown below:

Column 4,
Line 22, add -- 10 -- between "Approximately" and "mg".

Signed and Sealed this

Twenty-third Day of December, 2003

JAMES E. ROGAN
*Director of the United States Patent and Trademark Office*